United States Patent
Park et al.

(10) Patent No.: US 10,554,980 B2
(45) Date of Patent: Feb. 4, 2020

(54) METHOD FOR PROCESSING IMAGE ON BASIS OF INTRA PREDICTION MODE AND DEVICE THEREFOR

(71) Applicant: LG Electronics Inc., Seoul (KR)

(72) Inventors: Seungwook Park, Seoul (KR); Yongjoon Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 43 days.

(21) Appl. No.: 15/552,465

(22) PCT Filed: Feb. 19, 2016

(86) PCT No.: PCT/KR2016/001669
§ 371 (c)(1),
(2) Date: Aug. 21, 2017

(87) PCT Pub. No.: WO2016/137166
PCT Pub. Date: Sep. 1, 2016

(65) Prior Publication Data
US 2018/0048896 A1     Feb. 15, 2018

Related U.S. Application Data

(60) Provisional application No. 62/119,801, filed on Feb. 23, 2015.

(51) Int. Cl.
*H04N 19/15*     (2014.01)
*H04N 19/159*     (2014.01)
(Continued)

(52) U.S. Cl.
CPC ......... *H04N 19/159* (2014.11); *H04N 19/587* (2014.11); *H04N 19/59* (2014.11); *H04N 19/105* (2014.11); *H04N 19/107* (2014.11)

(58) Field of Classification Search
CPC .. H04N 19/159; H04N 19/117; H04N 19/176; H04N 19/59; H04N 19/587;
(Continued)

(56) References Cited

U.S. PATENT DOCUMENTS

2013/0294495 A1*  11/2013  Rossato ............... H04N 19/105
                                                            375/240.01
2015/0350657 A1*  12/2015  Heo ..................... H04N 19/159
                                                            375/240.12

FOREIGN PATENT DOCUMENTS

KR         10-0763194 B1    10/2007
KR     10-2010-0009718 A     1/2010
(Continued)

OTHER PUBLICATIONS

Machine translation for KR20100029343, IDS (Year: 2010).*
Machine translation for KR20070041290, IDS (Year: 2007).*

*Primary Examiner* — Qian Yang
(74) *Attorney, Agent, or Firm* — Dentons US LLP

(57) ABSTRACT

Disclosed is a method for processing an image on the basis of an intra-prediction mode and an apparatus therefor. The method for processing an image on the basis of an intra-prediction mode includes generating a prediction sample by performing intra-prediction on a processing block of the image, generating a sub-sampled prediction sample by sub-sampling the prediction sample, and generating an up-sampled prediction sample by up-sampling the sub-sampled reconstructed sample.

6 Claims, 14 Drawing Sheets

(51) Int. Cl.
*H04N 19/587* (2014.01)
*H04N 19/59* (2014.01)
H04N 19/105 (2014.01)
H04N 19/107 (2014.01)

(58) Field of Classification Search
CPC .... H04N 19/11; H04N 19/593; H04N 19/107; H04N 19/105
See application file for complete search history.

(56) References Cited

FOREIGN PATENT DOCUMENTS

| | | |
|---|---|---|
| KR | 10-2010-0029343 A | 3/2010 |
| KR | 10-2014-0062516 A | 5/2014 |
| KR | 10-2014-0110015 A | 9/2014 |

* cited by examiner

[FIG. 1]
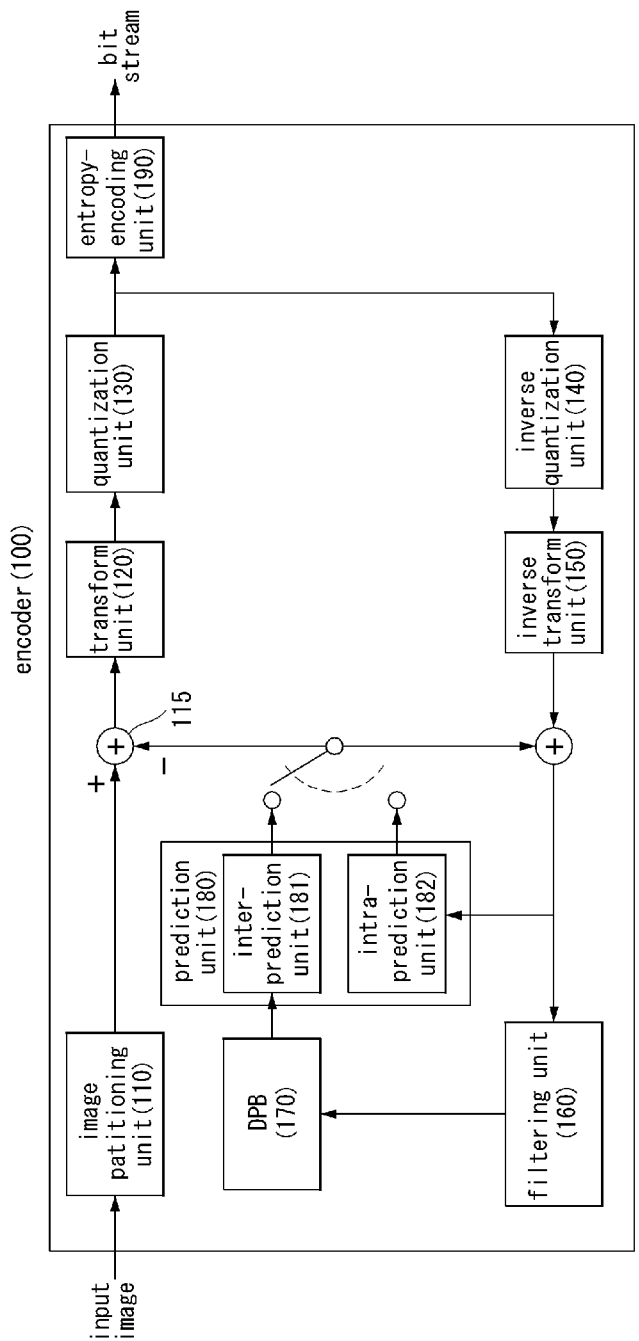

[FIG. 2]
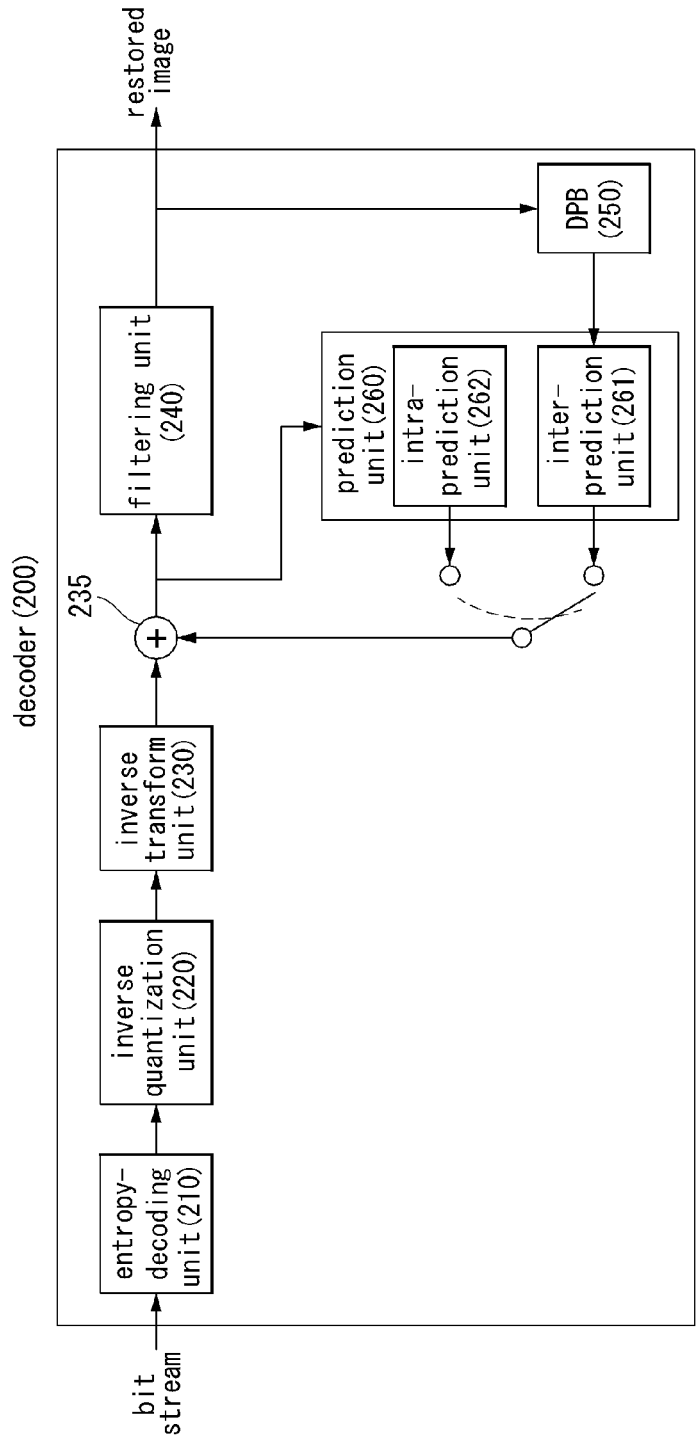

[FIG. 3]
Depth = 0
Depth = 1
Depth = 2
Depth = 3
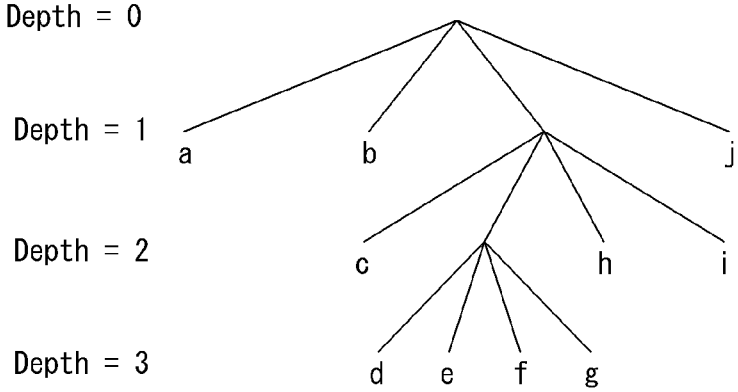
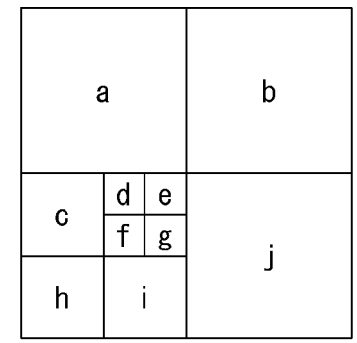
(a)    (b)

[FIG. 4]
Intra:
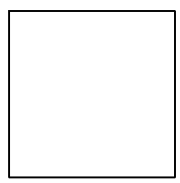
2Nx2N
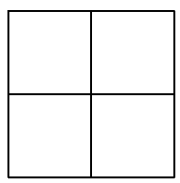
NxN
Inter:
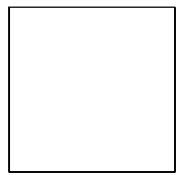
2Nx2N
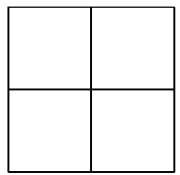
NxN
2NxN
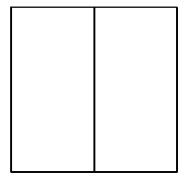
Nx2N
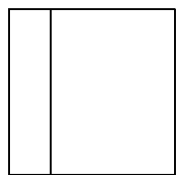
nLx2N
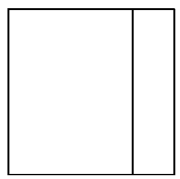
nRx2N
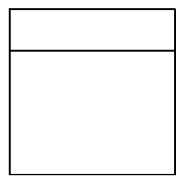
2NxnU
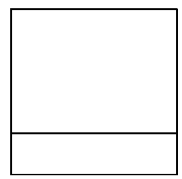
2NxnD

[FIG. 5]
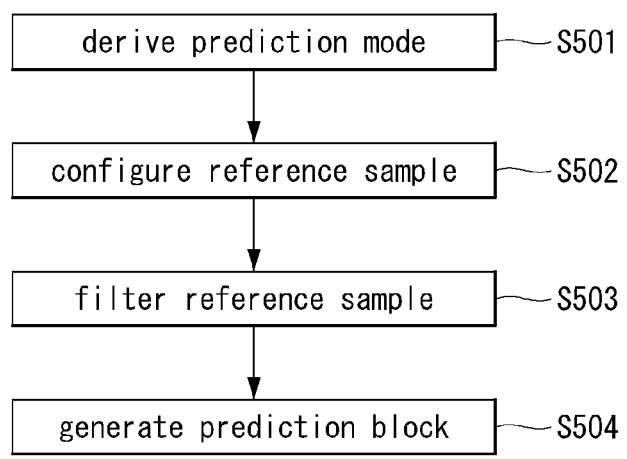

[FIG. 6]
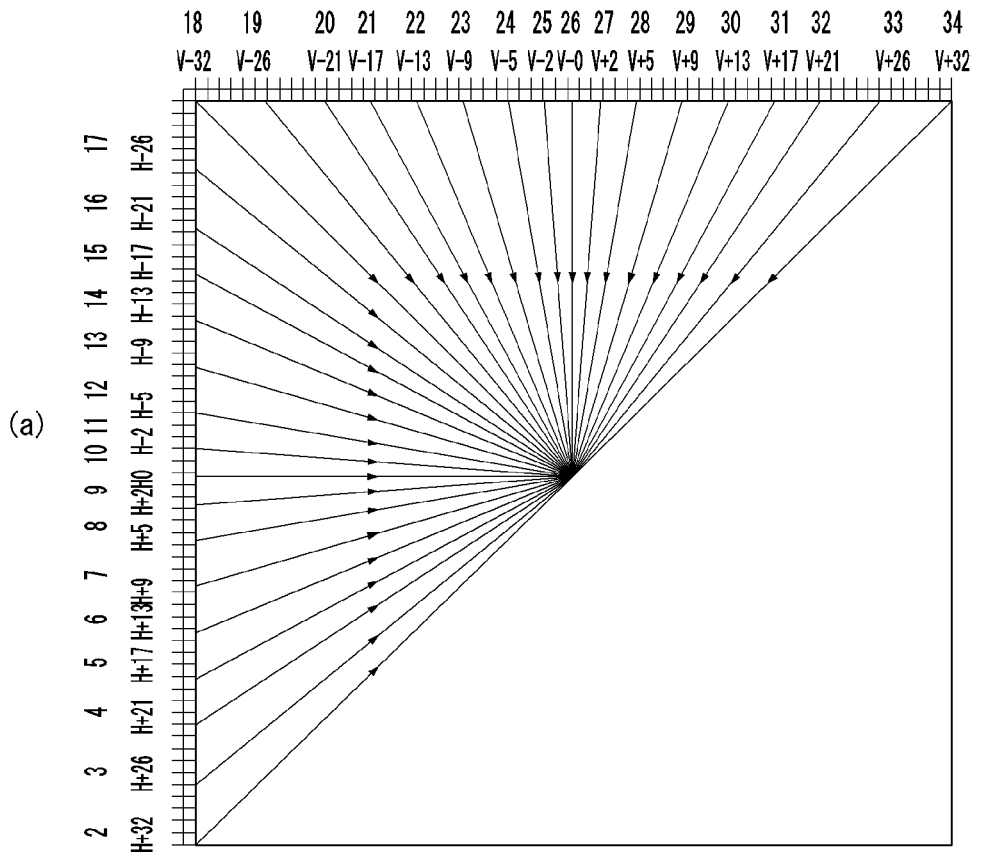
(a)
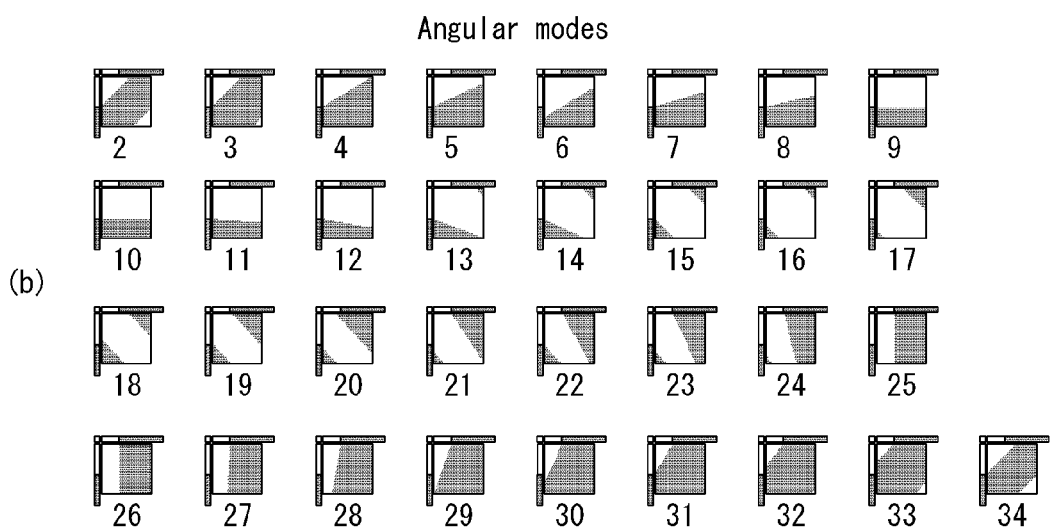
(b)

[FIG. 7]
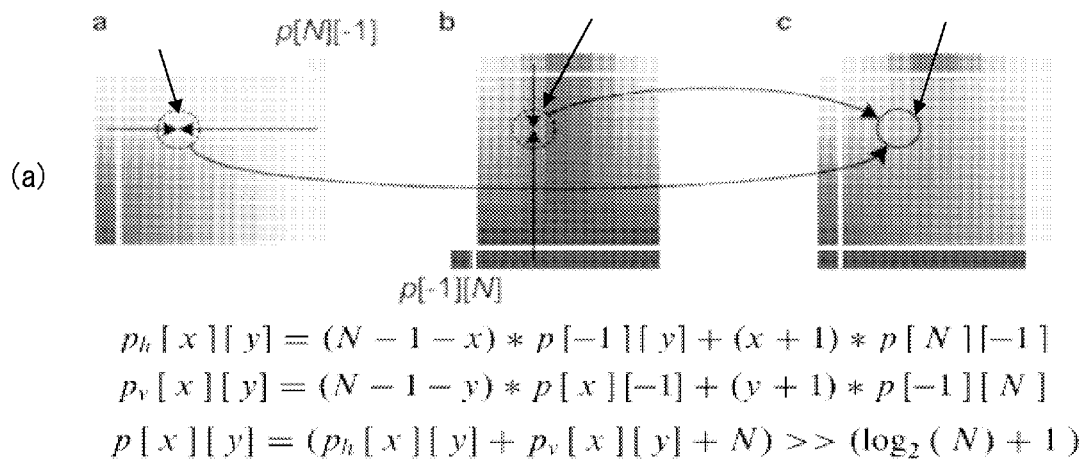
$$p_h[x][y] = (N - 1 - x) * p[-1][y] + (x + 1) * p[N][-1]$$
$$p_v[x][y] = (N - 1 - y) * p[x][-1] + (y + 1) * p[-1][N]$$
$$p[x][y] = (p_h[x][y] + p_v[x][y] + N) >> (\log_2(N) + 1)$$
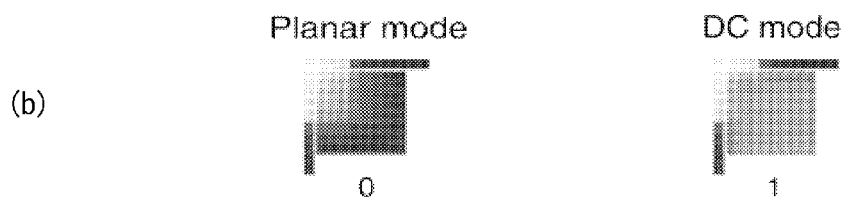

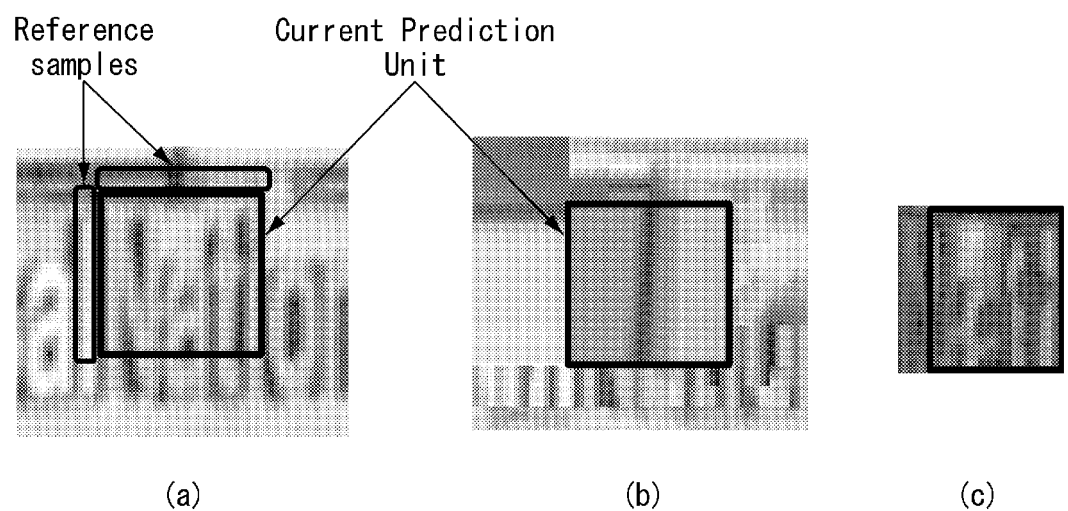
[FIG. 8]

[FIG. 9]
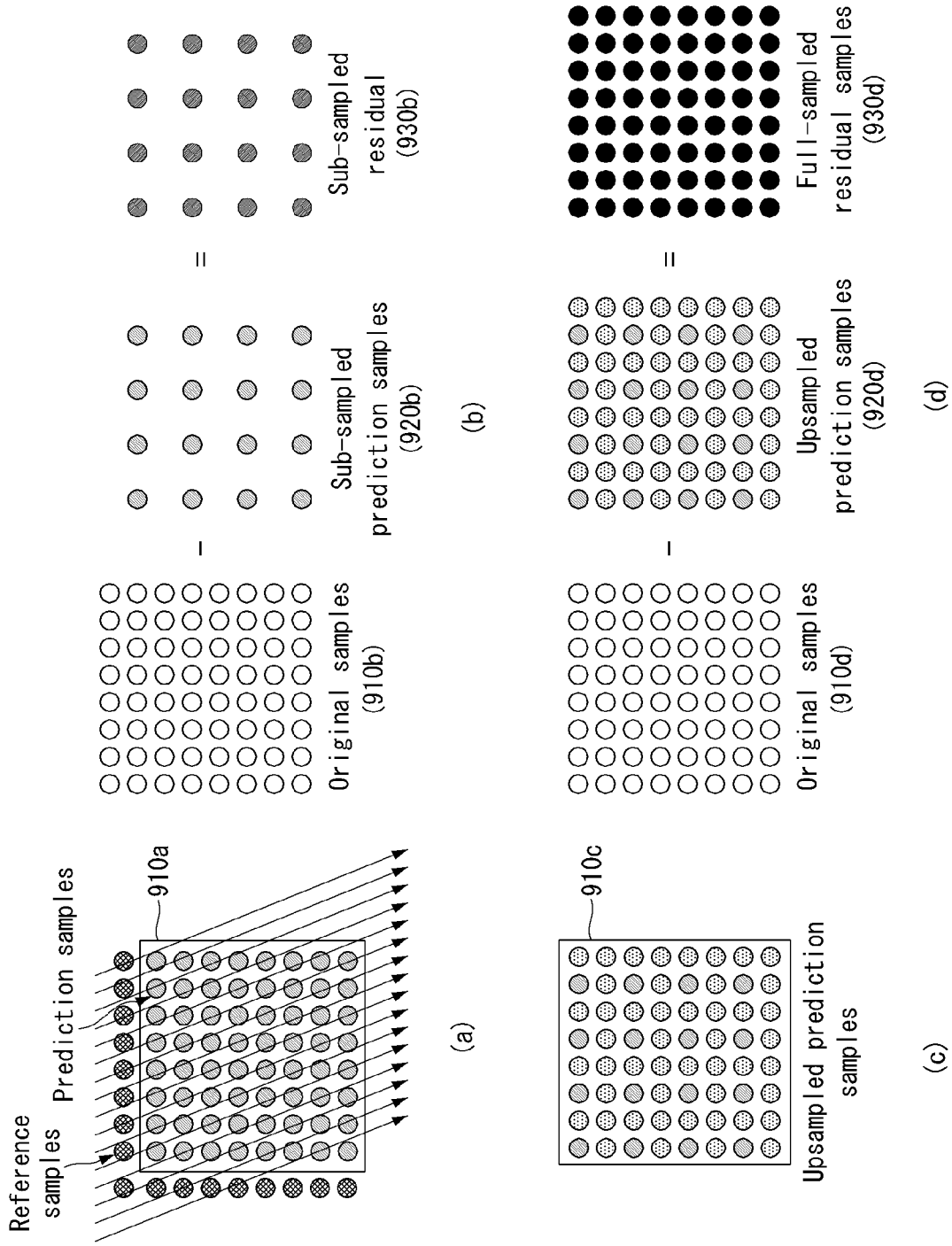

[FIG. 10]
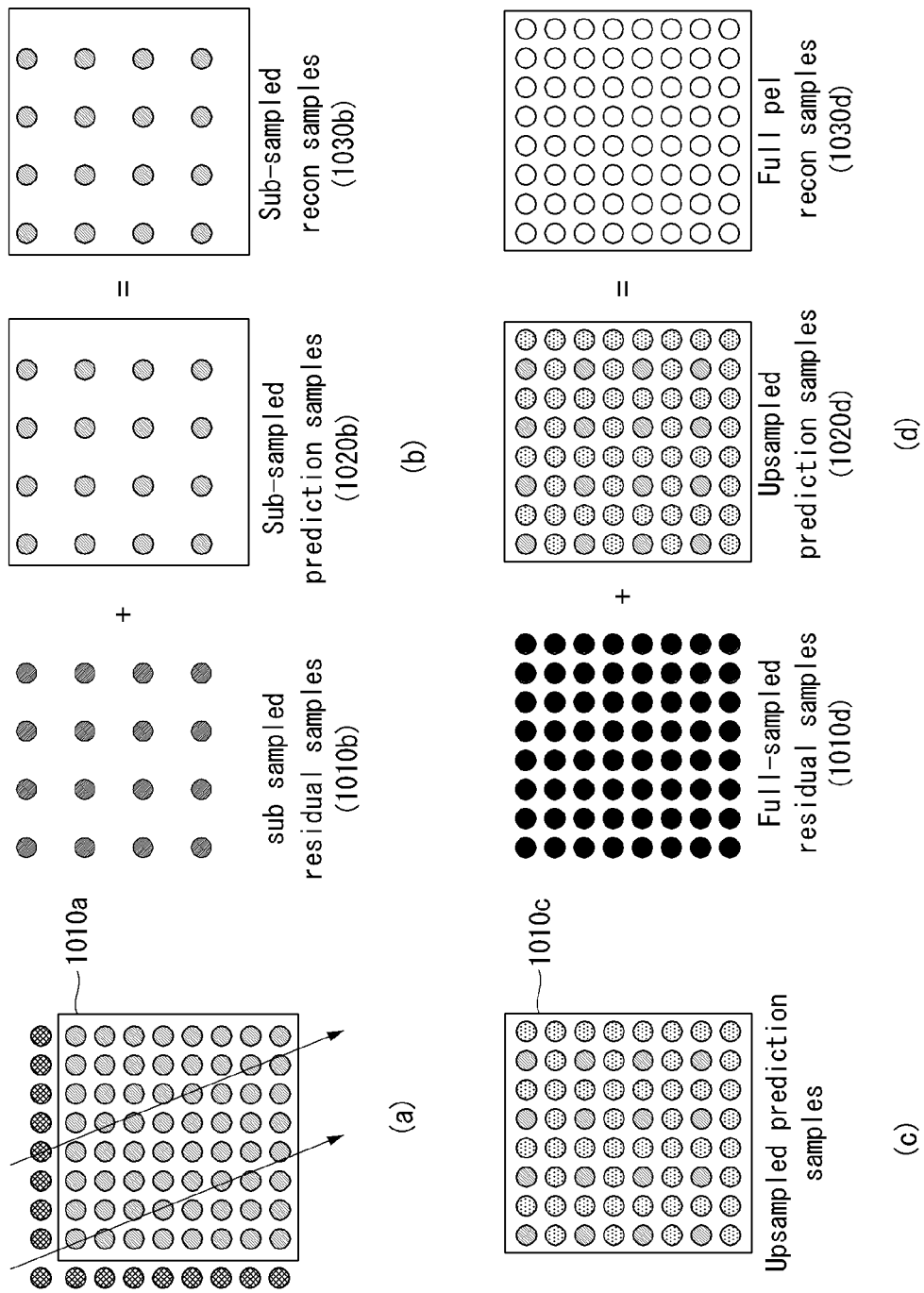

[FIG. 11]
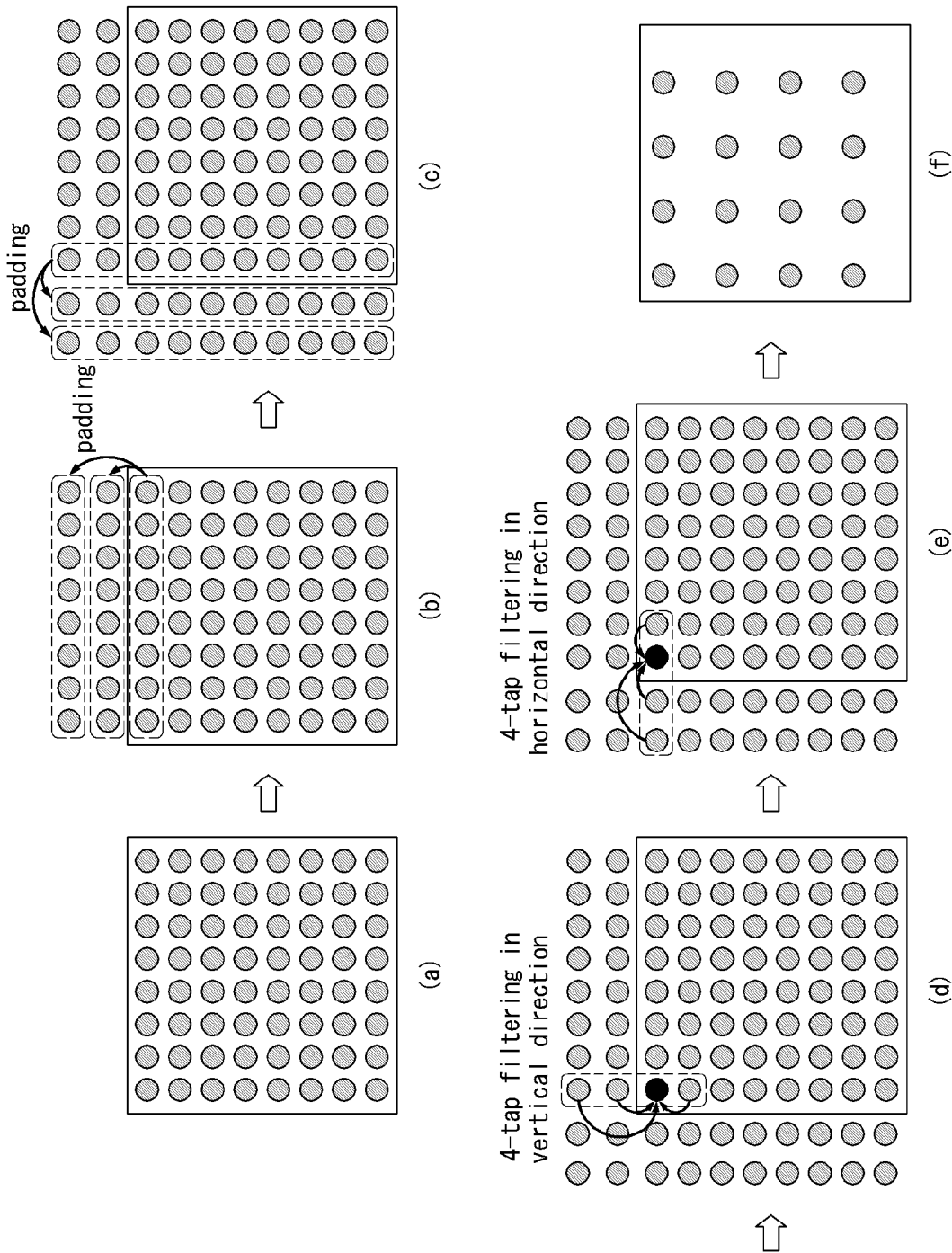

[FIG. 12]
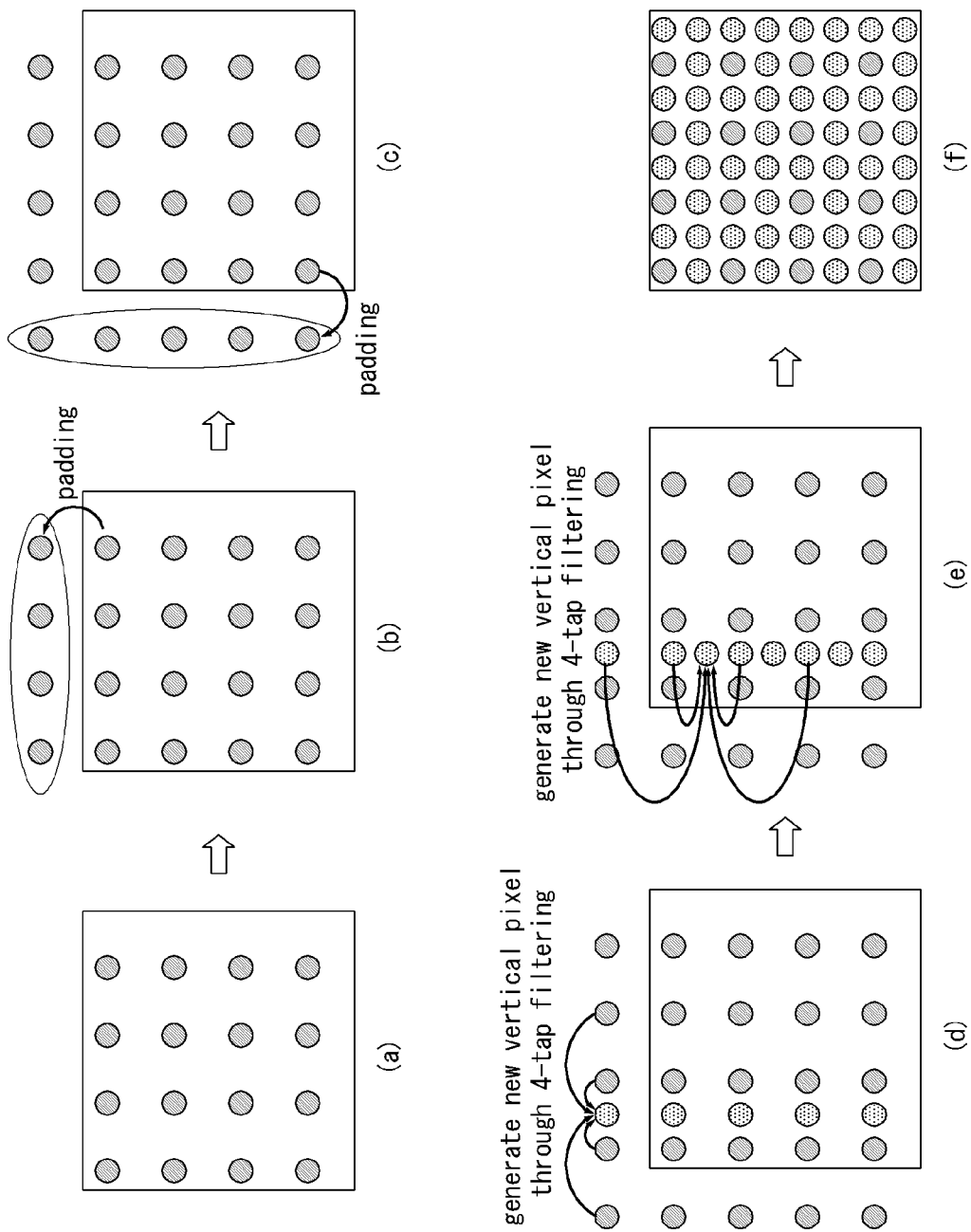

【FIG. 13】
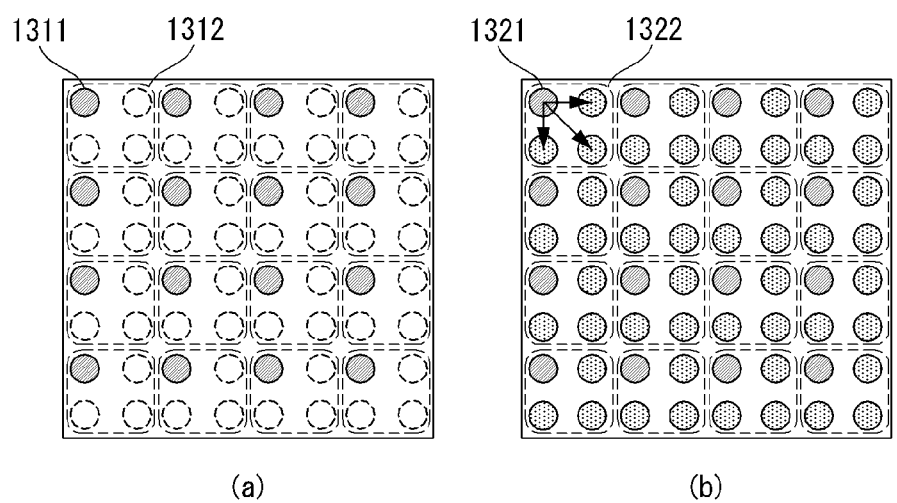
(a)                    (b)
【FIG. 14】
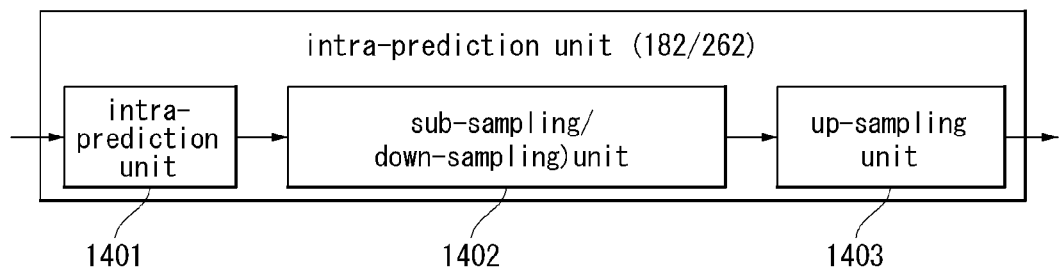

[FIG. 15]
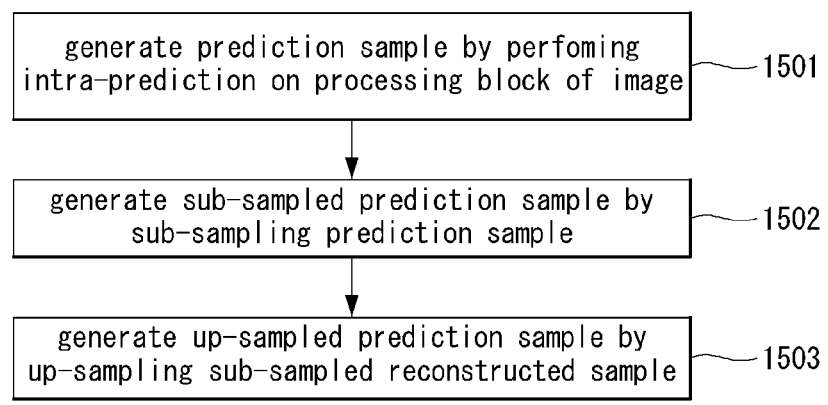

METHOD FOR PROCESSING IMAGE ON BASIS OF INTRA PREDICTION MODE AND DEVICE THEREFOR

CROSS-REFERENCE TO RELATED APPLICATIONS

This application is the National Stage filing under 35 U.S.C. 371 of International Application No. PCT/KR2016/001669, filed on Feb. 19, 2016, which claims the benefit of U.S. Provisional Application No. 62/119,801, filed on Feb. 23, 2015, the contents of which are all hereby incorporated by reference herein in their entirety.

TECHNICAL FIELD

The present invention relates to a method for processing a still image or video and, more particularly, to a method for encoding/decoding a still image or video on the basis of an intra-prediction mode and an apparatus supporting the method.

BACKGROUND ART

A compression encoding means a series of signal processing techniques for transmitting digitized information through a communication line or techniques for storing the information in a form that is proper for a storage medium. The media including a picture, an image, an audio, and the like may be the target for the compression encoding, and particularly, the technique of performing the compression encoding targeted to the picture is referred to as a video image compression.

The next generation video contents are supposed to have the characteristics of high spatial resolution, high frame rate and high dimensionality of scene representation. In order to process such contents, drastic increase of memory storage, memory access rate and processing power will be resulted.

Accordingly, it is required to design the coding tool for processing the next generation video contents efficiently.

DISCLOSURE

Technical Problem

An existing still image or video compression technology uses a method of compressing an image on the basis of a block. Here, when an intra-prediction mode is applied, if a reference sample and a sample of a block to be predicted are significantly different, prediction performance is significantly lowered to resultantly transmit a large amount of residual signals, significantly degrading a compression rate.

An aspect of the present invention provides an intra-prediction method capable of enhancing prediction performance and reducing residual signals.

The objects of the present invention are not limited to the technical objects described above, and other technical that are objects not mentioned herein may be understood to those skilled in the art from the description below.

Technical Solution

According to an aspect of the present invention, a method for processing an image on the basis of an intra-prediction mode may include: generating a prediction sample by performing intra-prediction on a processing block of the image; generating a sub-sampled prediction sample by sub-sampling the prediction sample; and generating an up-sampled prediction sample by up-sampling the sub-sampled reconstructed sample.

According to another aspect of the present invention, an apparatus for processing an image on the basis of an intra-prediction mode may include: an intra-prediction processing unit generating a prediction sample by performing intra-prediction on a processing block of the image; generating a sub-sampled prediction sample by a sub-sampling unit sub-sampling the prediction sample; and generating an up-sampled prediction sample by an up-sampling unit up-sampling the sub-sampled reconstructed sample.

Preferably, the sub-sampled reconstructed sample may be generated by adding a reconstructed sub-sampled residual sample and the sub-sampled prediction sample.

Preferably, the reconstructed sub-sampled residual sample may be generated through inverse-quantization and inverse-transform from a residual coefficient for the processing block.

Preferably, a full-sampled reconstructed sample for the processing block may be generated by adding a reconstructed full-sampled residual sample and the up-sampled prediction sample.

Preferably, the reconstructed full-sampled residual sample may be generated through inverse-quantization and inverse-transform from a residual coefficient for the processing block.

Preferably, the intra-prediction may be performed in a planar or DC mode.

Preferably, the method may further include: deriving an intra-prediction mode for the processing block, wherein the intra-prediction may be performed in the derived intra-prediction mode.

Preferably, a ratio of each of the sub-sampling and the up-sampling may be predefined or may be derived from a bit stream for the image.

Advantageous Effects

According to embodiments of the present invention, since a full-sampled prediction sample for a current block is generated on the basis of a sub-sampled reconstructed sample within the current block, whereby prediction performance may be enhanced, compared with the case of generating the full-sampled prediction sample on the basis of reference samples around the current block Also, according to embodiments of the present invention, since a full-sampled prediction sample for a current block is generated on the basis of a sub-sampled reconstructed sample within the current block, intra-prediction performance regarding a random texture region (e.g., a region in which a random pattern or an object is present within a block) may be enhanced.

In addition, according to embodiments of the present invention, since prediction performance is enhanced, residual signals may be reduced, thus enhancing a compression rate of an image.

The technical effects of the present invention are not limited to the technical effects described above, and other technical effects not mentioned herein may be understood to those skilled in the art from the description below.

DESCRIPTION OF DRAWINGS

The above and other aspects, features and other advantages of the present disclosure will be more clearly understood from the following detailed description taken in conjunction with the accompanying drawings, in which:

FIG. 1 is a schematic block diagram of an encoder which encodes a still image or a video signal according to an embodiment to which the present invention is applied.

FIG. 2 is a schematic block diagram of a decoder which decodes a still image or a video signal according to an embodiment to which the present invention is applied.

FIG. 3 is a view illustrating a structure for dividing a coding unit which can be applied to the present disclosure.

FIG. 4 is a view illustrating a prediction unit which can be applied to the present disclosure.

FIG. 5 is a view illustrating an intra-prediction method

FIG. 6 is a view illustrating directional prediction in an intra-prediction mode.

FIG. 7 is a view illustrating non-directional prediction in an intra-prediction mode.

FIG. 8 is a view illustrating a problem of an existing intra-prediction mode.

FIG. 9 is a view illustrating an intra-prediction mode-based image processing method according to an embodiment of the present invention.

FIG. 10 is a view illustrating an intra-prediction mode-based image processing method according to an embodiment of the present invention.

FIG. 11 is a view illustrating a sub-sampling or down-sampling process according to an embodiment of the present invention.

FIG. 12 is a view illustrating an up-sampling process according to an embodiment of the present invention.

FIG. 13 is a view illustrating sub-sampling (or down-sampling and up-sampling according to an embodiment of the present invention.

FIG. 14 is a view illustrating an intra-prediction unit according to an embodiment of the present invention.

FIG. 15 is a view illustrating a method for processing an image on the basis of an intra-prediction mode according to an embodiment of the present invention.

BEST MODES

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

Specific terminologies used in the description below may be provided to help the understanding of the present invention. And, the specific terminology may be modified into other forms within the scope of the technical concept of the present invention. For example, a signal, data, a sample, a picture, a frame, a block, etc may be properly replaced and interpreted in each coding process.

Hereinafter, in the present disclosure, "processing unit" refers to a unit on which a process of encoding/decoding such as prediction, transform, and/or quantization is performed. Hereinafter, for the purposes of description, a processing unit may also be termed a "processing block" or a "block".

The processing unit may be interpreted to have a meaning of including a unit regarding a luma component and a unit regarding a chroma component. For example, the processing unit may correspond to a coding tree unit (CTU), a coding unit (CU), a prediction unit (PU), or a transform unit (TU).

Also, the processing unit may be interpreted as a unit regarding a luma component or a unit regarding a chroma component. For example, the processing unit may correspond to a coding tree block (CTB), a coding block (CB), a prediction block (PB), or a transform block (TB) regarding a luma component. Or, the processing unit may correspond to a CTB, a CB, a PB, or a TB regarding a chroma component. Also, the processing unit may be interpreted as a meaning including a unit regarding a luma component and a unit regarding a chroma component but is not limited thereto.

Also, the processing unit may not be limited to a square block and may have a polygonal shape having three or more vertices.

Also, in the disclosure, a pixel or a picture element will be generally called a sample. Using a sample may refer to using a pixel value, a picture element value, and the like.

FIG. 1 is a schematic block diagram of an encoder encoding a still image or a video signal.

Referring to FIG. 1, an encoder 100 may include an image partitioning unit 110, a subtractor 115, a transform unit 120, a quantization unit 130, a inverse-quantization unit 140, an inverse-transform unit 150, an adder 155, a filtering unit 160, a decoded picture buffer 170, a prediction unit 180, an inter-prediction unit 181, and an intra-prediction unit 182.

The image partitioning unit 110 may segment an input video signal (or picture or frame) input to the encoder 100 into one or more processing units.

The subtractor 115 may subtract a prediction signal (or prediction block) output from the prediction unit 180 (i.e., the inter-prediction unit 181 or the intra-prediction unit 182), from the input video signal to generate a residual signal (or a residual block). The generated residual signal (or residual block) is transmitted to the transform unit 120.

The transform unit 120 applies a transform method (e.g., discrete cosine transform (DCT), discrete sine transform (DST), graph-based transform (GBT), Karhunen-Loeve transform (KLT), etc.) to generate a transform coefficient. Here, the transform unit 120 may perform transformation using a transform method determined according to a prediction mode applied to the residual block and a size of the residual block to generate transform coefficients.

The quantization unit 130 quantizes the transform coefficient and transmits the quantized transform coefficient to an entropy encoding unit 190, and the entropy encoding unit 190 entropy-codes a quantized signal and outputs a bit stream.

Meanwhile, the quantized signal output from the quantization unit 130 may be used to generate a prediction signal.

For example, the residual signal may be restored by applying inverse-quantization and inverse-transform to the quantized signal through the inverse-quantization unit 140 and the inverse-transform unit 150 of the loop.

The adder 155 may add the restored residual signal to the prediction signal output from the inter-prediction unit 181 or the intra-prediction unit 182 to generate a reconstructed signal.

On the other hand, during such a compression process, adjacent blocks are quantized by different quantization parameters from each other, and accordingly, an artifact in which block boundaries are shown may occur. Such a phenomenon is referred to blocking artifact, which is one of the important factors for evaluating image quality. In order to decrease such an artifact, a filtering process may be performed. Through such a filtering process, the blocking artifact is removed and the error for the current picture is decreased at the same time, thereby the image quality being improved.

The filtering unit 160 applies filtering to the reconstructed signal, and outputs it through a play-back device or transmits it to the decoded picture buffer 170. The filtered signal transmitted to the decoded picture buffer 170 may be used as a reference picture in the inter-prediction unit 181. As such, by using the filtered picture as a reference picture in an inter-picture prediction mode, the encoding rate as well as the image quality may be improved.

The decoded picture buffer 170 may store the filtered picture in order to use it as a reference picture in the inter-prediction unit 181.

The inter-prediction unit 181 performs a temporal prediction and/or a spatial prediction by referencing the reconstructed picture in order to remove a temporal redundancy and/or a spatial redundancy. Here, since the reference picture used for performing a prediction is a transformed signal that goes through the quantization or the inverse-quantization by a unit of block when being encoded/decoded previously, there may exist blocking artifact or ringing artifact.

Accordingly, in order to solve the performance degradation owing to the discontinuity of such a signal or the quantization, by applying a low pass filter to the inter-prediction unit 181, the signals between pixels may be interpolated by a unit of sub-pixel. Herein, the sub-pixel means a virtual pixel that is generated by applying an interpolation filter, and an integer pixel means an actual pixel that is existed in the reconstructed picture. As a method of interpolation, a linear interpolation, a bi-linear interpolation, a wiener filter, and the like may be applied.

The interpolation filter may be applied to the reconstructed picture, and may improve the accuracy of prediction. For example, the inter-prediction unit 181 may perform prediction by generating an interpolation pixel by applying the interpolation filter to the integer pixel, and by using the interpolated block that includes interpolated pixels as a prediction block.

The intra-prediction unit 182 predicts the current block by referring to the samples adjacent the block that is to be encoded currently. The intra-prediction unit 182 may perform the following procedure in order to perform the intra-prediction. First, the intra-prediction unit 182 may prepare a reference sample that is required for generating a prediction signal. And, the intra-prediction unit 182 may generate a prediction signal by using the reference sample prepared. Later, the intra-prediction unit 182 may encode the prediction mode. In this case, the reference sample may be prepared through reference sample padding and/or reference sample filtering. Since the reference sample goes through the prediction and the reconstruction process, there may be a quantization error. Accordingly, in order to decrease such an error, the reference sample filtering process may be performed for each prediction mode that is used for the intra-prediction.

In particular, the intra-prediction unit 182 according to the present disclosure may perform intra-prediction on the processing block of the image to generate a prediction sample, sub-sample the prediction sample to generate a sub-sampled prediction sample, and up-sample the sub-sampled reconstructed sample to generate an up-sampled prediction sample. Details of the intra-prediction unit 182 will be described hereinafter.

The prediction signal (or prediction block) generated through the inter-prediction unit 181 or the intra-prediction unit 182 may be used to generate a reconstructed signal (or reconstructed block) or a residual signal (or residual block).

FIG. 2 is a schematic block diagram of a decoder decoding a still image or a video signal according to an embodiment to which the present invention is applied.

Referring to FIG. 2, a decoder 200 may include an entropy decoding unit 210, a inverse-quantization unit 220, an inverse-transform unit 230, adder 235, a filtering unit 240, a decoded picture buffer (DPB) 250 and a prediction unit 260. And the prediction unit 260 may include an inter-prediction unit 261 and an intra-prediction unit 262.

And, the reconstructed video signal outputted through the decoder 200 may be played through a play-back device.

The decoder 200 receives the signal (i.e., bit stream) outputted from the encoder 100 shown in FIG. 1, and the entropy decoding unit 210 performs an entropy decoding operation of the received signal.

The inverse-quantization unit 220 obtains a transform coefficient from the entropy-decoded signal using quantization step size information.

The inverse-transform unit 230 inverse-transforms the transform coefficient by applying an inverse-transform technique to obtain a residual signal (or residual block).

The adder 235 adds the obtained residual signal (or residual block) to the prediction signal (or prediction block) output from the prediction unit 260 (i.e., the inter-prediction unit 261 or the intra-prediction unit 262) to generate a reconstructed signal (or reconstructed block).

The filtering unit 240 applies filtering to the reconstructed signal (or reconstructed block) and outputs the filtered signal to a reproducing device (or player) or transmits the same to the DPB 250. The filtered signal transmitted to the DPB 250 may be used as reference picture in the inter-prediction unit 261.

In this disclosure, the embodiments described in the filtering unit 160, the inter-prediction unit 181 and the intra-prediction unit 182 of the encoder 100 may also be applied in the same manner to the filtering unit 240, the inter-prediction unit 261, and the intra-prediction unit 262 of the decoder, respectively.

In particular, the intra-prediction unit 262 according to the present disclosure may perform intra-prediction on the processing block of the image to generate a prediction sample, sub-sample the prediction sample to generate a sub-sampled prediction sample, and up-sample the sub-sampled reconstructed sample to generate an up-sampled prediction sample. Details of the intra-prediction unit 2522 will be described hereinafter.

Generally, the block-based image compression method is used in the compression technique (e.g., HEVC) of a still image or a video. The block-based image compression method is a method of processing an image by partitioning it into a specific block unit, and may decrease the use of memory and the amount of operation.

FIG. 3 is a diagram for describing a partition structure of a coding unit that may be applied to the present invention.

An encoder partitions a single image (or picture) in a coding tree unit (CTU) of a rectangle shape, and encodes the CTU sequentially one by one according to a raster scan order.

In the HEVC, a size of CTU may be determined by one of 64×64, 32×32 and 16×16. The encoder may select and use the size of CTU according to the resolution of input image or the characteristics of input image. The CTU includes a coding tree block (CTB) for a luma component and the CTB for two chroma components that correspond to it.

One CTU may be partitioned into a quad tree structure. That is, one CTU may be partitioned into four units each having a square shape and having a half horizontal size and a half vertical size, generating coding units (CUs). Dividing the quad tree structure may be recursively performed. That is, a CU is hierarchically segmented to a quad tree structure from one CTU.

The CU refers to a basic unit in processing an input image, for example, coding of performing intra/inter-prediction. The CU includes a coding block (CB) regarding a luma component and a CB regarding two chroma components corresponding thereto. In HEVC, a size of the CU may be determined to any one of 64×64, 32×32, 16×16, and 8×8.

Referring to FIG. 3, a root node of a quad tree relates to a CTU. The quad tree is partitioned until it reaches a leaf node, and the leaf node corresponds to a CU.

In detail, a CTU corresponds to a root node and has a smallest depth value (i.e., depth=0). The CTU may not be partitioned depending on characteristics of an input image, and in this case, the CTU corresponds to a CU.

The CTU may be partitioned into a quad tree form, and as a result, lower nodes having a depth of 1 (depth=1) are generated. A node (i.e., a leaf node) which is not partitioned any further from the lower node having a depth of 1 corresponds to a CU. For example, in FIG. 3(b), CU(a), CU(b), and CU(j) have been once partitioned from a CTU and have a depth of 1.

At least any one of the nodes having the depth of 1 may be partitioned into a quad tree form again, and as a result, lower nodes having a depth of 2 (i.e., depth=2) are generated. Also, a node (i.e., leaf node) which cannot be partitioned into any further from the lower node having a depth of 2 corresponds to a CU. For example, in FIG. 3(b), CU(c), CU(h), and CU(i) corresponding to nodes c, h, and i have been partitioned twice and have a depth of 2.

Also, at least any one of the nodes having the depth of 2 may be partitioned again into a quad tree form, and as a result, lower nodes having a depth of 3 (i.e., depth=3) are generated. Also, a node (i.e., leaf node) which cannot be divided any further from the lower node having the depth of 3 corresponds to a CU. For example, in FIG. 3(b), CU(d), CU(e), CU(f), and CU(g) corresponding to d, e, f, and g have been partitioned three times from the CTU and have a depth of 3.

In an encoder, the maximum size or the minimum size of a CU may be determined according to the characteristics of a video image (e.g., resolution) or by considering encoding rate. And, the information for this or the information that may derive this may be included in a bit stream. The CU that has the maximum size is referred to as a largest coding unit (LCU), and the CU that has the minimum size is referred to as a smallest coding unit (SCU).

In addition, the CU that has a tree structure may be hierarchically partitioned with predetermined maximum depth information (or maximum level information). And, each partitioned CU may have the depth information. Since the depth information represents a partitioned count and/or degree of a CU, the depth information may include the information of a size of CU.

Since the LCU is partitioned in a Quad tree shape, the size of SCU may be obtained by using a size of LCU and the maximum depth information. Or, inversely, the size of LCU may be obtained by using a size of SCU and the maximum depth information of the tree.

For a single CU, the information (e.g., a partition CU flag (split_cu_flag)) that represents whether the corresponding CU is partitioned may be forwarded to a decoder. This partition information is included in all CUs except the SCU. For example, when the value of the flag that represents whether to partition is '1', the corresponding CU is further partitioned into four CUs, and when the value of the flag that represents whether to partition is '0', the corresponding CU is not partitioned any more, and the processing process for the corresponding CU may be performed.

As described above, the CU is a basic unit of the coding in which the intra-prediction or the inter-prediction is performed. The HEVC partitions the CU in a prediction unit (PU) for coding an input image more effectively.

The PU is a basic unit for generating a prediction block, and even in a single CU, the prediction block may be generated in different way by a unit of PU. However, the intra-prediction and the inter-prediction are not used together for the PUs that belong to a single CU, and the PUs that belong to a single CU are coded by the same prediction method (i.e., the intra-prediction or the inter-prediction).

The PU is not partitioned in the Quad tree structure, but is partitioned once in a single CU in a predetermined shape. This will be described by reference to the drawing below.

FIG. 4 is a diagram for describing a prediction unit that may be applied to the present invention.

A PU is differently partitioned depending on whether the intra-prediction mode is used or the inter-prediction mode is used as the coding mode of the CU to which the PU belongs.

FIG. 4(a) illustrates a PU of the case that the intra-prediction mode is used, and FIG. 4(b) illustrates a PU of the case that the inter-prediction mode is used.

Referring to FIG. 4(a), assuming the case that the size of a single CU is 2N×2N (N=4, 8, 16 and 32), a single CU may be partitioned into two types (i.e., 2N×2N or N×N).

Here, in the case that a single CU is partitioned into the PU of 2N×2N shape, it means that only one PU is existed in a single CU.

On the other hand, in the case that a single CU is partitioned into the PU of N×N shape, a single CU is partitioned into four PUs, and different prediction blocks are generated for each PU unit. However, such a PU partition may be performed only in the case that the size of CB for the luma component of CU is the minimum size (i.e., the case that a CU is an SCU).

Referring to FIG. 4(b), assuming the case that the size of a single CU is 2N×2N (N=4, 8, 16 and 32), a single CU may be partitioned into eight PU types (i.e., 2N×2N, N×N, 2N×N, N×2N, nL×2N, nR×2N, 2N×nU and 2N×nD)

Similar to the intra-prediction, the PU partition of N×N shape may be performed only in the case that the size of CB for the luma component of CU is the minimum size (i.e., the case that a CU is an SCU).

The inter-prediction supports the PU partition in the shape of 2N×N that is partitioned in a horizontal direction and in the shape of N×2N that is partitioned in a vertical direction.

In addition, the inter-prediction supports the PU partition in the shape of nL×2N, nR×2N, 2N×nU and 2N×nD, which is an asymmetric motion partition (AMP). Here, 'n' means ¼ value of 2N. However, the AMP may not be used in the case that the CU to which the PU is belonged is the CU of minimum size.

In order to encode the input image in a single CTU efficiently, the optimal partition structure of the coding unit (CU), the prediction unit (PU) and the transform unit (TU) may be determined based on a minimum rate-distortion value through the processing process as follows. For example, as for the optimal CU partition process in a 64×64 CTU, the rate-distortion cost may be calculated through the partition process from the CU of 64×64 size to the CU of 8×8 size. The detailed process is as follows.

1) The optimal partition structure of PU and TU that generates the minimum rate distortion value is determined through performing the inter/intra-prediction, the transformation/quantization, the inverse-quantization/inverse transformation and the entropy encoding for the CU of 64×64 size.

2) The optimal partition structure of PU and TU is determined to partition the 64×64 CU into four CUs of 32×32 size and to generate the minimum rate distortion value for each 32×32 CU.

3) The optimal partition structure of PU and TU is determined to further partition the 32×32 CU into four CUs of 16×16 size and to generate the minimum rate distortion value for each 16×16 CU.

4) The optimal partition structure of PU and TU is determined to further partition the 16×16 CU into four CUs of 8×8 size and to generate the minimum rate distortion value for each 8×8 CU.

5) The optimal partition structure of CU in the 16×16 block is determined by comparing the rate-distortion value of the 16×16 CU that is obtained in the process of 3) above with the addition of the rate-distortion value of the four 8×8 CUs that is obtained in the process of 4) above. This process is also performed for remaining three 16×16 CUs in the same manner.

6) The optimal partition structure of CU in the 32×32 block is determined by comparing the rate-distortion value of the 32×32 CU that is obtained in the process of 2) above with the addition of the rate-distortion value of the four 16×16 CUs that is obtained in the process of 5) above. This process is also performed for remaining three 32×32 CUs in the same manner.

7) Lastly, the optimal partition structure of CU in the 64×64 block is determined by comparing the rate-distortion value of the 64×64 CU that is obtained in the process of 1) above with the addition of the rate-distortion value of the four 32×32 CUs that is obtained in the process of 6) above.

In the intra-prediction mode, a prediction mode is selected in units of PU, and prediction and reconstruction are actually carried out on the selected prediction mode in units of TU.

The TU refers to a basic unit by which actual prediction and reconstruction are carried out. The TU includes a transform block (TB) regarding a luma component and a TB regarding two chroma components corresponding thereto.

In the foregoing example of FIG. 3, like one CTU is partitioned into a QT structure to generate CUs, a TU is hierarchically partitioned into a QT structure from one CU.

Since the TU is partitioned to a QT structure, the TU partitioned from a CU may be partitioned into smaller TUs again. In HEVC, a size of a TU may be determined to any one of 32×32, 16×16, 8×8, and 4×4.

Referring back to FIG. 3, it is assumed that a root node of a QT is related to a CU. A QT is partitioned until it reaches a leaf node, and the leaf node corresponds to a TU.

In detail, a CU corresponds to a root node and has a smallest depth (i.e., depth=0). The CU may not be partitioned according to characteristics of an input image, and in this case, the CU corresponds to a TU.

The CU may be partitioned to a QT form, and as a result, lower nodes having a depth of 1 (depth=1) are generated. Among the lower nodes having the depth of 1, a node which is not partitioned any further (i.e., a leaf node) corresponds to a TU. For example, in FIG. 3(b), TU(a), TU(b), and TU(j) respectively corresponding to a, b, and j have been once partitioned from a CU and have a depth of 1.

At least any one of nodes having the depth of 1 may also be partitioned to a QT form, and as a result, lower nodes having a depth of 2 (i.e., depth=2) are generated. Among the lower nodes having the depth of 2, a node which is not partitioned any further (i.e., a lead node) corresponds to a TU. For example, in FIG. 3(b), TU(c), TU(h), and TU(i) respectively corresponding to c, h, and I have been partitioned twice from a CU and have the depth of 2.

Also, at least one of nodes having the depth of 2 may be partitioned again to a QT form, and as a result, lower nodes having a depth of 3 (i.e., depth=3) are generated. Among the lower nodes having the depth of 3, a node which is not partitioned any further (i.e., a leaf node) corresponds to a CU. For example, in FIG. 3(b), TU(d), TU(e), TU(f), and TU(g) respectively corresponding to nodes d, e, f, and g have been partitioned three times and have the depth of 3.

The TU having a tree structure may be hierarchically partitioned with predetermined largest depth information (or largest level information). Also, each of the partitioned TUs may have depth information. Since depth information represents the number by which the TU has been partitioned and/or a degree to which the TU has been divided, the depth information may include information regarding a size of the TU.

Regarding one TU, information (e.g., a split TU flag (split_tranform_flag) representing whether the corresponding TU is partitioned may be delivered to the decoder. The split information is included in every TU except for a TU having a smallest size. For example, if the value of the flag representing partition is '1', the corresponding TU is partitioned again into four TUs, while if the flag representing partition is '0', the corresponding CU is not partitioned any further.

FIG. 5 is a view illustrating an intra-prediction method.

Referring to FIG. 5, the decoder derives an intra-prediction mode of a current processing block (S501).

In intra-prediction, a prediction mode may have a prediction direction regarding a position of a reference sample used for prediction. An intra-prediction mode having a prediction direction is called an intra-angular prediction mode. Meanwhile, an intra-prediction mode not having a prediction direction includes an infra-planar (INTRA_PLANAR) prediction mode, an intra-DC (INTRA_DC) prediction mode.

Table 1 illustrates titles related to intra-prediction modes.

TABLE 1

| Intra-prediction mode | Associated name |
| --- | --- |
| 0 | INTRA_PLANAR |
| 1 | INTRA_DC |
| 2 . . . 34 | INTRA_ANGULAR2 . . . INTRA_ANGULAR34 |

In intra-prediction, prediction is performed on a current processing block on the basis of a derived prediction mode. Since a reference sample used in prediction and a specific prediction method are varied, when a current block is encoded in the intra-prediction mode, the decoder derives a prediction mode of the current block to perform prediction.

The decoder determines whether neighboring samples of the current processing block are available to be used for prediction, and configures reference samples to be used for prediction (S502).

In intra-prediction, neighboring samples of the current processing block refer to a total of 2×nS number of samples adjacent to a left boundary and a bottom-left of the current processing block having a size of nS×nS, a total of 2×nS number of samples adjacent to a top boundary and a top-right of the current processing block, and one sample adjacent to a top-left of the current processing block.

However, some of the neighboring samples of the current processing block may not have been decoded yet or may not be available to be used. In this case, the decoder may configure reference samples to be used for prediction by substituting the unavailable samples with available samples.

The decoder may perform filtering on the reference sample on the basis of the intra-prediction mode (S503).

Whether to perform filtering on the reference sample may be determined on the basis of a size of the current processing block. Also, a method for filtering the reference sample may be determined by a filtering flag transferred from the encoder.

The decoder generates a prediction block regarding the current processing block on the basis of the intra-prediction mode and the reference samples (S504). That is, the decoder generates a prediction block (i.e., a prediction sample) regarding the current processing block on the basis of the reference samples obtained through the intro-prediction mode derived in the intra-prediction mode deriving step (S501) and the reference samples obtained through the reference sample configuring step (S502) and the reference sample filtering step (S503).

In cases where the current processing block has been encoded in the INTR_DC mode, the decoder may filter a left boundary sample (i.e., a sample within a prediction block adjacent to a left boundary) and a top boundary sample (i.e., a sample of a prediction block adjacent to the top boundary) in step S504 in order to minimize discontinuity of the boundary between processing blocks.

Also, in step S504, filtering may be applied to the left boundary sample and a top boundary sample in the vertical mode and the horizontal mode among intra-angular prediction modes in a manner similar to that of the INTRA_DC mode.

In detail, when the current processing block is encoded in the vertical mode or the horizontal mode, a value of a prediction sample may be derived on the basis of a reference sample positioned in a prediction direction. Here, a boundary sample not positioned in the prediction direction among the left boundary sample or the top boundary sample of the prediction block may be adjacent to a reference sample not used for prediction. That is, a distance to a reference sample not used for prediction may be even closer than a distance to the reference sample used for prediction.

Thus, the decoder may adaptively apply filtering to left boundary samples or top boundary samples according to whether the intra-prediction direction is a vertical direction or a horizontal direction. That is, when the intra-prediction direction is a vertical direction, the decoder may apply filtering on the left boundary samples, and when the intra-prediction direction is a horizontal direction, the decoder may apply filtering on the top boundary samples.

As illustrated in Table 1, the intra-prediction mode may be classified as directional prediction and non-directional prediction.

FIG. 6 is a view illustrating directional prediction in the intra-prediction mode.

The directional prediction is largely used when a prediction signal of texture having an angular direction is created.

FIG. 6($a$) illustrates 34 angular directions defined in the HEVC, and FIG. 6($b$) illustrates patterns of prediction signals according to each direction.

FIG. 7 is a view illustrating non-directional prediction in the intra-prediction mode.

The non-directional prediction is used when a prediction signal of generally smooth texture without a specific angular direction is created.

FIG. 7($a$) illustrates a planar prediction method, and FIG. 7($b$) illustrates patterns of prediction signals according to a planar mode and a DC mode.

As illustrated in FIG. 7($a$), the sum of a horizontal prediction value (p_h[x][y]) and a vertical prediction value (p_v[x][y]) regarding the current prediction sample (p[x][y]) is derived.

The horizontal prediction value (p_h[x][y]) is derived by the sum of a neighboring sample (p[−1][y]) positioned on the left to which a predetermined weight value has been applied and a neighboring sample (p[N][−1]) positioned on the right to which a predetermined weight value has been applied. Also, the vertical prediction value (p_v[x][y]) is derived by the sum of a neighboring sample (p[x][−1]) positioned on the top to which a predetermined weight value has been applied and a neighboring sample (p[−1][N]) positioned on the bottom to which a predetermined weight value has been applied.

When intra-prediction decoding is performed, a mode other than the DC mode and the planar mode has an angular direction. In cases where a block to be predicted has a pattern in a predetermined direction, accuracy of prediction signal is increased, but when a random pattern (sand, leaf, cloud, etc.) is present in a block or when an object is present in a block, prediction accuracy may be degraded.

Also, although coding is performed in the non-directional DC mode and the planar mode, prediction accuracy may be increased in a smooth region without an angular direction, but prediction of a region having a pattern without an angular direction is low.

FIG. 8 is a view illustrating a problem of existing intra-mode prediction.

Referring to FIG. 8, when a difference between the current prediction unit and reference samples is significant, a predicted image is significantly different from an original image as illustrated in FIG. 8($b$) and a residual signal generated due to inaccurate prediction remains as is in the form of the original image as illustrated in FIG. 8($c$).

In other words, a biggest problem of the existing technique is that, when a reference sample used to create a prediction signal is significantly different from a signal of a block desired to be predicted, prediction performance is drastically degraded and, as a result, a large amount of residual signals are transmitted, degrading a compression rate.

In order to solve the problem, the present invention proposes an effective intra-prediction (non-directional intra-prediction) method. In particular, in order to more accurately represent a random texture region (e.g., a region of a block in which a random pattern or object is present), the present invention proposes a method of performing prediction and reconstruction after reducing a size of a current block (i.e., sub-sampling or down-sampling) and up-sampling a size of a reconstructed small block to use it as a prediction block regarding the current block.

In this manner, a residual signal regarding the current block may include a first residual signal based on the sub-sampled prediction signal and a second residual signal based on a full-sampling-based prediction sample up-sampled from the sub-sampled reconstructed sample. In particular, in cases where reference samples are significantly different from samples within the current prediction block, residual signals regarding samples not included in the first residual signal, among the second residual signals, are generated from sub-sampled reconstructed sample, and thus, the residual signals may be significantly reduced, compared with the residual signals generated on the basis of the existing intra-prediction, whereby a compression rate of an image may be enhanced.

FIG. 9 illustrates an intra-prediction mode-based image processing method according to an embodiment of the present invention.

FIGS. 9(a) to 9(d) sequentially illustrate first to fourth steps of an intra-prediction method according to the present invention in the aspect of the encoder.

In FIG. 9, a case in which a current processing block has a size of 8×8 is illustrated, but this is merely illustrative for the purposes of description and the present invention is not limited thereto.

Referring to FIG. 9(a), in the first step, the encoder generates (or derives) a prediction signal/block 910a for the current processing block by utilizing the existing intra-prediction method. That is, the encoder may generate (or derive) the prediction signal/block 910a according to steps S502 to S504 of FIG. 5 described above.

Here, the encoder may explicitly apply an optimal intra-prediction mode through rate-distortion (RD) optimization. In this case, the encoder should transmit the intra prediction mode applied to the current processing block to the decoder.

Also, the encoder may use a specific intra-prediction mode, e.g., the HEVC planar mode or the DC mode, among the intra-prediction modes illustrated in Table 1 above, as a default mode. Here, an intra-prediction mode used by the encoder as a default mode may be predefined, and since the decoder already knows that, the encoder may not transmit the intra-prediction mode applied to the current processing block to the decoder.

Referring to FIG. 9(b), in the second step, the encoder generates (or derives) sub-sampled residual samples.

First, the encoder sub-samples or down-samples the prediction samples 910a obtained in first step to generate (or derive) sub-sampled prediction samples 920b.

In the present invention, sub-sampling and down-sampling may be interpreted as having the same meaning and refers to reducing resolution of a processing block. Details of sub-sampling and down-sampling will be described hereinafter, but the present invention is not limited thereto and various sub-sampling and down-sampling methods may be used.

Here, the sub-sampling or down-sampling may have any ratio, and in cases where a ratio of sub-sampling or down-sampling is not predefined, the encoder transmits a ratio to the decoder. Here, the ratio refers to a ratio between resolution of the processing block before sub-sampling (or down-sampling) is applied and resolution of the processing block after sub-sampling (down-sampling) is applied.

Thereafter, the encoder obtains sub-sampled residual samples 930b, which is a difference between the original samples 910b and the sub-sampled prediction samples 920b, entropy-codes a residual coefficient generated through transform and quantization, and stores the entropy-coded residual coefficient in a bit stream.

Referring to FIG. 9(c), in the third step, the encoder generates (or derives) sub-sampled reconstructed samples by adding the sub-sampled residual samples reconstructed through inverse-quantization and inverse-transform and the sub-sampled prediction samples 920b.

Also, the encoder generates (or derives) up-sampled prediction samples 910c by up-sampling the sub-sampled reconstructed samples in consideration of the sub-sampling ratio or down-sampling ratio used in second step.

In the present invention, up-sampling refers to increasing resolution of the processing block. Details of up-sampling will be described hereinafter, but the present invention is not limited thereto and various up-sampling methods may be used.

Referring to FIG. 9(d), in the fourth step, the encoder generates (or derives) full-sampled residual samples 930d through a difference between the original samples 910d and the up-sampled prediction samples 920d.

Also, the encoder entropy-codes the full-sampled residual samples 930d through transform and quantization, and stores the same in a bit stream.

FIG. 10 illustrates an intra-prediction mode-based image processing method according to an embodiment of the present invention.

FIGS. 10(a) to 10(d) sequentially illustrate first to fourth steps of an intra-prediction method according to the present invention in the aspect of the decoder.

In FIG. 10, a case in which a current processing block has a size of 8×8 is illustrated, but this is merely illustrative for the purposes of description and the present invention is not limited thereto.

Referring to FIG. 10(a), in the first step, when the intra-prediction mode has been coded and provided from the encoder, the decoder performs conventional prediction in the same intra-prediction mode. That is, the decoder may generate (or derive) a prediction signal/block 1010a according to steps S502 to S504 of FIG. 5 described above.

Meanwhile, the prediction mode has not been coded and provided from the encoder, the decoder performs prediction in an intra-prediction mode predefined to be the same as that of the encoder, e.g., in the planar or DC mode. That is, the decoder may generate (or derive) the prediction signal/block 1010a according to steps S502 to S504 of FIG. 5 described above.

Referring to FIG. 10(b), in the second step, the decoder generates (or derives) sub-sampled prediction samples 1020b using the same sub-sampling or down-sampling method as that of the encoder. That is, the decoder generates the sub-sampled prediction samples 1020b by sub-sampling or down-sampling the prediction samples 1010a obtained in the first step.

Here, in cases where a ratio of the sub-sampling or down-sampling has been predefined, the predefined ratio may be used, or in cases where the ratio has not been predefined, the decoder may use a ratio provided from the encoder.

Also, the decoder generates (or derives) sub-sampled residual samples 1010a reconstructed through inverse-quantization and inverse-transform from a residual coefficient obtained through bit stream parsing on the image.

Also, the decoder generates (or derives) sub-sampled reconstructed samples 1030b, which is the sum of the sub-sampled prediction samples 1020b and the sub-sampled residual samples 1010a.

Referring to FIG. 10(c), in the third step, the decoder obtains prediction samples 1010c up-sampled using the same up-sampling method as that used in the encoder.

That is, the decoder generates (or derives) up-sampled prediction samples 1010c by up-sampling the reconstructed samples 1030b sub-sampled in consideration of a sub-sampling ratio or down-sampling ratio used in the second step.

Referring to FIG. 10(d), in the fourth step, the decoder generates (or derives) full-sampled residual samples 1010d by performing inverse-quantization and inverse-transform no the residual coefficient obtained through bit stream parsing.

Also, the decoder adds the full-sampled residual samples to the full-sampled prediction samples 1020d (i.e., the up-sampled prediction samples) obtained in advance to obtain full pixels reconstructed samples 1030d.

FIG. 11 is a view illustrating a sub-sampling or down-sampling process according to an embodiment of the present invention.

According to the present invention, the encoder/decoder may generate sub-sampled prediction samples by applying a multi-tap filter in a horizontal direction and in a vertical direction. Here, sub-sampling or down-sampling may be performed by padding values present in the boundary of the current processing block.

In FIG. 11, a case in which sub-sampling or down-sampling is performed using a 4-tap filter is illustrated and a case in which the current processing block has a size of 8×8 and a ratio of sub-sampling or down-sampling is 1/2 (=sub-sampled block/current processing block) is illustrated but this is merely illustrative for the purposes of description and the present invention is not limited thereto.

FIG. 11(a) illustrates the current processing block. As illustrated in FIGS. 11(a) and 11(c), the encoder/decoder may derive values of samples positioned around the current processing block through padding with values of samples positioned in the top and left boundaries of the current processing block. In other words, the encoder/decoder may pad the neighboring sample values in a vertical direction with values of samples positioned in the top boundary of the current processing block as illustrated in FIG. 11(b) and perform padding in a horizontal direction with values of samples positioned in the left boundary of the current processing block as illustrated in FIG. 11(c). In FIG. 11, an example in which padding is sequentially performed in the vertical direction and in the horizontal direction is illustrated, but the present invention is not limited thereto and the order of performing padding may be interchanged.

Also, the encoder/decoder may derive sub-sampled prediction samples positioned in the top and left boundaries of the current processing block by performing sub-sampling or down-sampling through 4-tap filtering. In other words, the encoder/decoder may derive sample values positioned in the top boundary of the current processing block through the 4-tap filter in the vertical direction as illustrated in FIG. 11(d), and derive sample values positioned in the left boundary of the current processing block through the 4-tap filter in the horizontal direction as illustrated in FIG. 11(e). In FIG. 11, an example in which filtering is sequentially performed in the vertical direction and in the horizontal direction, but the present invention is not limited thereto and the order of performing filtering may be interchanged.

Here, the same value predefined as a multi-tap filter coefficient may be used both in the encoder/decoder, and the encoder may transmit a filter coefficient value to the decoder.

Also, as illustrated in FIG. 11(f), the encoder/decoder may derive sub-sampled prediction samples regarding the current processing block through 4-tap filtering.

FIG. 12 is a view illustrating an up-sampling process according to an embodiment of the present invention.

According to an embodiment of the present invention, the encoder/decoder may generate up-sampled prediction samples by applying a multi-tap filter in a horizontal direction and in a vertical direction. Here, when samples which can be used are present around the current processing block, up-sampling may be performed using the corresponding samples as is, and when samples which can be used are not present, up-sampling may be performed by padding values of the boundary of the current processing block.

In FIG. 12, a case in which up-sampling is performed using a 4-tap filter is illustrated and a case in which the current processing block has a size of 8×8 and a ratio of sub-sampling or down-sampling is 1/2 (=sub-sampled block/current processing block) is illustrated but this is merely illustrative for the purposes of description and the present invention is not limited thereto.

FIG. 12(a) illustrates sub-sampled prediction samples regarding the current processing block. As illustrated in FIGS. 12(b) and 12(c), the encoder/decoder may derive values of samples positioned around the current processing block through padding with values of samples positioned in the top and left boundaries of the current processing block. That is, the encoder/decoder may pad the neighboring sample values in a vertical direction with values of samples positioned in the top boundary of the current processing block as illustrated in FIG. 12(b) and perform padding in a horizontal direction with values of samples positioned in the left boundary of the current processing block as illustrated in FIG. 12(c). In FIG. 12, an example in which padding is sequentially performed in the vertical direction and in the horizontal direction, but the present invention is not limited thereto and the order of performing padding may be interchanged.

Also, the encoder/decoder may generate samples (i.e., samples not present due to sub-sampling or down-sampling) in a new vertical direction and a new horizontal direction by performing up-sampling through 4-tap filtering. In other words, the encoder/decoder may derive sample values in the new vertical direction through a horizontal 4-tap filter as illustrated in FIG. 12(d) and derive sample values in a new horizontal direction through a vertical 4-tap filter as illustrated in FIG. 12(e). In FIG. 12, an example in which filtering is sequentially performed in the vertical direction and in the horizontal direction is illustrated, but the present invention is not limited thereto and the order of performing filtering may be interchanged.

Here, the same value predefined as a multi-tap filter coefficient may be used both in the encoder/decoder, and the encoder may transmit a filter coefficient value to the decoder.

Also, as illustrated in FIG. 12(*f*), the encoder/decoder may derive up-sampled prediction samples regarding the current processing block through 4-tap filtering.

Meanwhile, in FIGS. 11 and 12, a case in which sub-sampling (or down-sampling) and up-sampling are performed through multi-tap filtering is illustrated, but the present invention is not limited thereto and details thereof will be described with reference to FIG. 13 hereinafter.

FIG. 13 is a view illustrating sub-sampling (or down-sampling) and up-sampling according to an embodiment of the present invention.

FIG. 13(*a*) illustrates sub-sampling (or down-sampling) and FIG. 13(*b*) illustrates up-sampling.

Referring to FIG. 13(*a*), the encoder/decoder may divide the prediction block (please refer to FIGS. 9(*a*) and 10(*a*)) derived by the conventional intra-prediction by a square shape according to a sub-sampling (or down-sampling) ratio, and perform sub-sampling (or down-sampling) using specific sample values of each region as sub-sampled prediction samples. For example, top-left samples 1311 of the respective regions may be used as sub-sampled prediction samples of the current processing block.

Alternatively, the encoder/decoder may perform sub-sampling (or down-sampling) using a medium or average value of the samples 1312 belonging to each region, as sub-sampled prediction sample values.

Referring to FIG. 13(*b*), the encoder/decoder may perform up-sampling by padding the other remaining sample value 1322 with a sub-sampled prediction sample value 1321 within a square region divided according to a sub-sampling (or down-sampling) ratio within the current processing block.

FIG. 14 is a view illustrating an intra-prediction unit according to an embodiment of the present invention.

In FIG. 14, an intra-prediction unit 182 (please refer to FIG. 1)/262 (please refer to FIG. 2) is illustrated as one block for the purposes of description, but the intra-prediction unit 182 may be implemented as a component included in the encoder and/or the decoder.

Referring to FIG. 14, the intra-prediction unit 182/262 implements the functions, processes and/or methods proposed in FIGS. 9 to 13. In detail, the intra-prediction unit 182/262 may include an intra-prediction processing unit 1401, a sub-sampling/down-sampling unit 1402, and an up-sampling unit 1403.

The intra-prediction processing unit 1401 generates a prediction block (i.e., a prediction sample) regarding a current processing block using a conventional intra-prediction method. For example, the method illustrated in FIGS. 5 to 7 may be used.

The sub-sampling/down-sampling unit 1402 may generate (or derive) sub-sampled prediction samples by sub-sampling or down-sampling prediction samples output from the intra-prediction processing unit 1401.

First, referring to a follow-up process in the aspect of the encoder, the encoder (specifically the subtractor 115 of FIG. 1) subtracts the sub-sampled prediction samples output from the sub-sampling/down-sampling unit 1402 from the original samples to generate (or derive) sub-sampled residual samples (or sub-sampled residuals). Also, the encoder (in particular, the transform unit 120 of FIG. 1) may generate a transform coefficient by applying a transform technique to the sub-sampled residuals, and the encoder (in particular, the quantization unit 130 of FIG. 1) may quantize the transform coefficient to generate a residual coefficient. Also, the encoder (in particular, the entropy-encoding unit 190 of FIG. 1) may entropy-code the residual coefficient and output a bit stream.

Also, the encoder (in particular, the inverse-quantization unit of FIG. 1) may inverse-quantize the residual coefficient and the encoder (in particular, the inverse-transform unit 150 of FIG. 1) may apply inverse transform on the inverse-quantized signal to reconstruct the sub-sampled residuals.

Also, the encoder (in particular, the adder 155 of FIG. 1) may generate (or derive) sub-sampled reconstructed samples by adding the reconstructed sub-sampled residuals and the sub-sampled prediction samples output from the sub-sampling/down-sampling unit 1402 to.

Referring to a follow-up process in the aspect of the decoder, the decoder (in particular, the entropy-decoding unit 210 of FIG. 2) may parse a bit stream regarding an image to generate (or derive) a residual coefficient. Also, the decoder (in particular, the inverse-quantization unit 220 of FIG. 2) may apply inverse-quantization to the residual coefficient, and the decoder (in particular, the inverse-transform unit 230 of FIG. 2) may generate (or derive) sub-sampled residual samples reconstructed through inverse-transform.

Also, the decoder (in particular, the adder 235 of FIG. 2) may generate (or derive) sub-sampled reconstructed samples by adding the reconstructed sub-sampled residual samples and the sub-sampled prediction samples output from the sub-sampling/down-sampling unit 1402.

The up-sampling unit 1403 may generate (or derive) up-sampled prediction samples by up-up-sampling the sub-sampled reconstructed samples in consideration of a sub-sampling ratio (or down-sampling ratio).

First, referring to a follow-up process in the aspect of the encoder, the encoder (in particular, the subtractor 115 of FIG. 1) may generate (derive) full-sampled residuals by subtracting up-sampled prediction samples output from the sub-sampling/down-sampling unit 1403, from the original samples. Also, the encoder (in particular, the transform unit 120 of FIG. 1) may apply a transform technique to the full-sampled residuals to generate a transform coefficient. Also, the encoder (in particular, the quantization unit 130 of FIG. 1) may quantize the transform coefficient to generate a residual coefficient. Also, the encoder (in particular, the entropy-encoding unit 190 of FIG. 1) may entropy-code the residual coefficient to output a bit stream.

Referring to a follow-up process in the aspect of the decoder, the decoder (in particular, the entropy-decoding unit 210 of FIG. 2) may parse the bit stream regarding the image to generate (or derive) a residual coefficient. Also, the decoder (in particular the inverse-quantization unit 220 of FIG. 2) inverse-quantizes the residual coefficient, and the decoder (in particular, the inverse-transform unit 230 of FIG. 2) may generate (or derive) full-sampled residual samples reconstructed through inverse-transform.

Also, the decoder (in particular, the adder 235 of FIG. 2) may generate (or derive) full-sampled reconstructed samples by adding the up-sampled prediction samples output from the up-sampling unit 1403 and the reconstructed full-sampled residual samples.

FIG. 15 is a view illustrating a method for processing an image on the basis of an intra-prediction mode according to an embodiment of the present invention.

Referring to FIG. 15, the encoder/decoder generates a prediction block (i.e., a prediction sample) regarding a current processing block using a conventional intra-prediction method (S1501).

Here, the intra-prediction may be performed in a predefined intra-prediction mode (e.g., the planar or DC mode).

Also, intra-prediction may be performed in an intra-prediction mode derived (or applied) regarding the corresponding processing block.

The encoder/decoder may sub-sample or down-sample the prediction samples output in step S1501 to generate (or derive) sub-sampled prediction samples (S1502).

Here, a ratio of the sub-sampling (or down-sampling) may be predefined or may be derived from a bit stream regarding the corresponding image.

The encoder/decoder may generate (or derive) up-sampled prediction samples by up-sampling the sub-sampled reconstructed samples in consideration of the sub-sampling ratio (or down-sampling ratio) (S1503).

Here, the ratio of up-sampling may be predefined or may be derived from a bit stream regarding the corresponding image.

Here, the sub-sampled reconstructed samples may be generated by adding the reconstructed sub-sampled residual samples and the sub-sampled prediction block (or sub-sampled prediction samples). Here, the sub-sampled residual samples may be a difference between the original samples of the processing block and the sub-sampled prediction samples. Also, the reconstructed sub-sampled residual samples may be generated through inverse-quantization and inverse transform from the residual coefficient regarding the processing block.

Also, the full-sampled reconstructed samples regarding the processing block thereafter may be generated by adding the reconstructed full-sampled residual samples and the up-sampled prediction samples. Here, the full-sampled residual samples may be a difference between the original sample of the processing block and the up-sampled prediction samples. Also, the reconstructed full-sampled residual samples may be generated through inverse quantization and inverse transform from the residual coefficient regarding the processing block.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

The preferred embodiments of the present disclosure described above are disclosed for an exemplary purpose, and modifications, changes, substitutions, or additions of various other embodiments may be hereinafter made by those skilled in the art within the technical spirit and the technical scope of the present invention disclosed in the appended claims.

The invention claimed is:

1. A method for processing an image on the basis of an intra-prediction mode, the method comprising:
   generating a prediction sample by performing intra-prediction on a processing block of the image;
   generating a sub-sampled prediction sample by sub-sampling the prediction sample;
   generating an up-sampled prediction sample by up-sampling a sub-sampled reconstructed sample, and
   generating a full-sampled reconstructed sample for the processing block by adding a reconstructed full-sampled residual sample and the up-sampled prediction sample,
   wherein, in generating the prediction sample, the intra-prediction is performed by predefined prediction mode, when the intra-prediction is not coded in the processing block of the image,
   wherein a ratio of each of the sub-sampling and the up-sampling is predefined,
   wherein the sub-sampled reconstructed sample is generated by adding a reconstructed sub-sampled residual sample and the sub-sampled prediction sample,
   wherein the reconstructed sub-sampled residual sample is generated through inverse-quantization and inverse-transform from a residual coefficient for the processing block, and
   wherein the reconstructed full-sampled residual sample is generated through inverse-quantization and inverse-transform from a residual coefficient for the processing block.

2. The method of claim 1, wherein the intra-prediction is performed in a planar or DC mode.

3. The method of claim 1, further comprising:
   deriving an intra-prediction mode for the processing block,
   wherein the intra-prediction is performed in the derived intra-prediction mode.

4. The method of claim 1, wherein the predefined prediction is one of DC mode and planar mode.

5. An apparatus for processing an image on the basis of intra-prediction, the apparatus comprising:
a processor configured to
generate a prediction sample by performing intra-prediction on a processing block of the image,
generate a sub-sampled prediction sample by sub-sampling the prediction sample;
generate an up-sampled prediction sample by up-sampling a sub-sampled reconstructed sample, and
generate a full-sampled reconstructed sample for the processing block by adding a reconstructed full-sampled residual sample and the up-sampled prediction sample,
wherein the intra-prediction is performed by predefined prediction mode, when the prediction mode is not coded in the processing block of the image,
wherein a ratio of each of the sub-sampling and the up-sampling is predefined,
wherein the sub-sampled reconstructed sample is generated by adding a reconstructed sub-sampled residual sample and the sub-sampled prediction sample,
wherein the reconstructed sub-sampled residual sample is generated through inverse-quantization and inverse-transform from a residual coefficient for the processing block, and
wherein the reconstructed full-sampled residual sample is generated through inverse-quantization and inverse-transform from a residual coefficient for the processing block.

6. The apparatus of claim 5, wherein the predefined prediction is one of DC mode and planar mode.

* * * * *